US012720265B2

(12) United States Patent
von Holten

(10) Patent No.: US 12,720,265 B2
(45) Date of Patent: Aug. 25, 2026

(54) SYSTEMS AND METHODS FOR IMPROVING HEARING PERFORMANCE BY A HEARING DEVICE

(71) Applicant: SONOVA AG, Staefa (CH)

(72) Inventor: Daniel von Holten, Hombrechtikon (CH)

(73) Assignee: Sonova AG, Staefa (CH)

( * ) Notice: Subject to any disclaimer, the term of this patent is extended or adjusted under 35 U.S.C. 154(b) by 323 days.

(21) Appl. No.: 18/612,594

(22) Filed: Mar. 21, 2024

(65) Prior Publication Data

US 2025/0301267 A1 Sep. 25, 2025

(51) Int. Cl.

| | |
|---|---|
| ***H04R 25/00*** | (2006.01) |
| ***G06T 11/26*** | (2026.01) |
| ***G06V 20/20*** | (2022.01) |
| ***G06V 20/50*** | (2022.01) |

(52) U.S. Cl.

CPC ............ *H04R 25/505* (2013.01); *G06T 11/26* (2026.01); *G06V 20/20* (2022.01); *G06V 20/50* (2022.01); *H04R 25/558* (2013.01); *H04R 2225/41* (2013.01); *H04R 2225/43* (2013.01)

(58) Field of Classification Search

None

See application file for complete search history.

(56) References Cited

U.S. PATENT DOCUMENTS

| | | | | |
|---|---|---|---|---|
| 2010/0183161 | A1 | 7/2010 | Boretzki | |
| 2013/0142345 | A1 * | 6/2013 | Waldmann | H04R 25/50 381/56 |
| 2021/0314711 | A1 * | 10/2021 | Pischel | H04R 25/554 |
| 2022/0021988 | A1 * | 1/2022 | Wexler | G06V 40/16 |

FOREIGN PATENT DOCUMENTS

| | | | |
|---|---|---|---|
| EP | 1912476 | B1 | 7/2012 |
| WO | 2011103934 | A1 | 9/2011 |

* cited by examiner

*Primary Examiner* — Antim G Shah

(74) *Attorney, Agent, or Firm* — ALG Intellectual Property, LLC

(57) ABSTRACT

An exemplary method includes a hearing system accessing one or more images of an environment of a user located at a position within the environment and wearing a hearing device to hear sound within the environment, determining a current hearing performance level being provided by the hearing device worn by user at the position, determining, based on the one or more images, one or more expected hearing performance levels at one or more other positions in the environment, and performing, based on the determining of the current hearing performance level and the one or more expected hearing performance levels, a hearing performance enhancement operation configured to improve the current hearing performance level.

18 Claims, 13 Drawing Sheets

SYSTEMS AND METHODS FOR IMPROVING HEARING PERFORMANCE BY A HEARING DEVICE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Hearing devices may implement sound processing algorithms that are configured to improve hearing performance of the hearing devices. For instance, hearing devices may process speech and background noise differently to enhance speech understanding.

However, the environment of the user may have a major impact on the hearing performance. While there may be hearing strategies to improve the hearing performance in the environment, users may not be aware of such hearing strategies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for improving hearing performance by a hearing device are described herein. As will be described in more detail below, an exemplary system may comprise a memory storing instructions and a processor communicatively coupled to the memory and configured to execute the instructions to perform a process. The process may comprise accessing one or more images of an environment of a user located at a position within an environment and wearing a hearing device to hear sound within the environment, determining, by the processor, a current hearing performance level being provided by the hearing device worn by user at the position, determining, by the processor based on the one or more images, one or more expected hearing performance levels at one or more other positions in the environment, and performing, by the processor based on the determining of the current hearing performance level and the one or more expected hearing performance levels, a hearing performance enhancement operation configured to improve the current hearing performance level.

By using systems and methods such as those described herein, it may be possible to improve hearing performance provided by a hearing device to a user in an environment. Such hearing performance enhancement operations may be based on one or more images of the environment accessed by the system. For instance, the user may capture one or more images of the environment using a mobile device. The system may analyze the one or more images (as well as acoustic information of the environment, which may be included with the one or more images as a video and/or captured by the hearing device and/or the mobile device) to determine expected hearing performance levels of one or more positions in the environment. The system may compare the expected hearing performance levels to a current hearing performance level and perform a hearing performance enhancement operation (e.g., by providing an indication of one or more positions that may improve the hearing performance level, etc.). In this manner (and as other examples described herein), the system may improve the hearing performance as experienced by the user in an environment. Other benefits of the systems and methods described herein will be made apparent herein.

Figure 1:
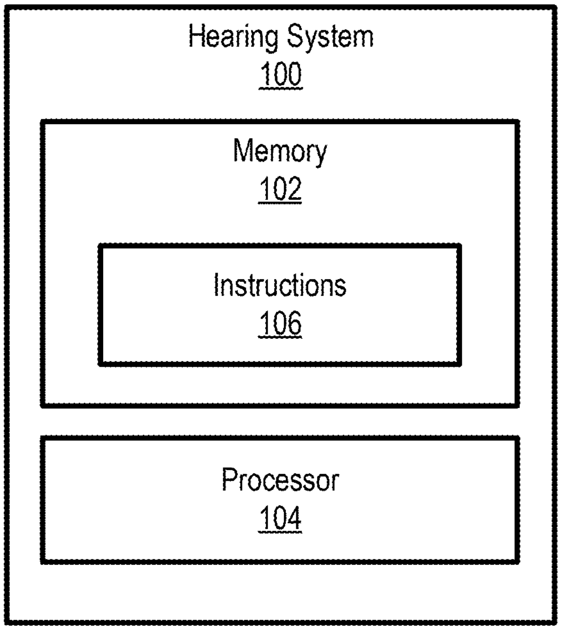
FIG. 1 illustrates an exemplary hearing system that may be implemented according to principles described herein.

FIG. 1 illustrates an exemplary hearing system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device such as described herein. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store hearing loss profile data, user preference data, setting data, acoustic parameter data, machine learning data, input sound classification data, hearing performance data, graphical user interface content, and/or any other suitable data.

Processor 104 may be configured to perform (e.g., execute instructions 106 stored in memory 102 to perform) various processing operations associated with improving hearing performance. For example, processor 104 may perform one or more operations described herein to perform, based on a determining of a current hearing performance level and one or more expected hearing performance levels at one or more positions in an environment of a user, a hearing performance enhancement operation configured to improve the current hearing performance level. These and other operations that may be performed by processor 104 are described herein.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

In some examples, a hearing device may additionally or alternatively include earbuds, headphones, hearables (e.g., smart headphones), and/or any other suitable device that may be used to facilitate a user perceiving sound in an environment. In such examples, the user may correspond to either a hearing impaired user or a non-hearing impaired user.

Figure 2:
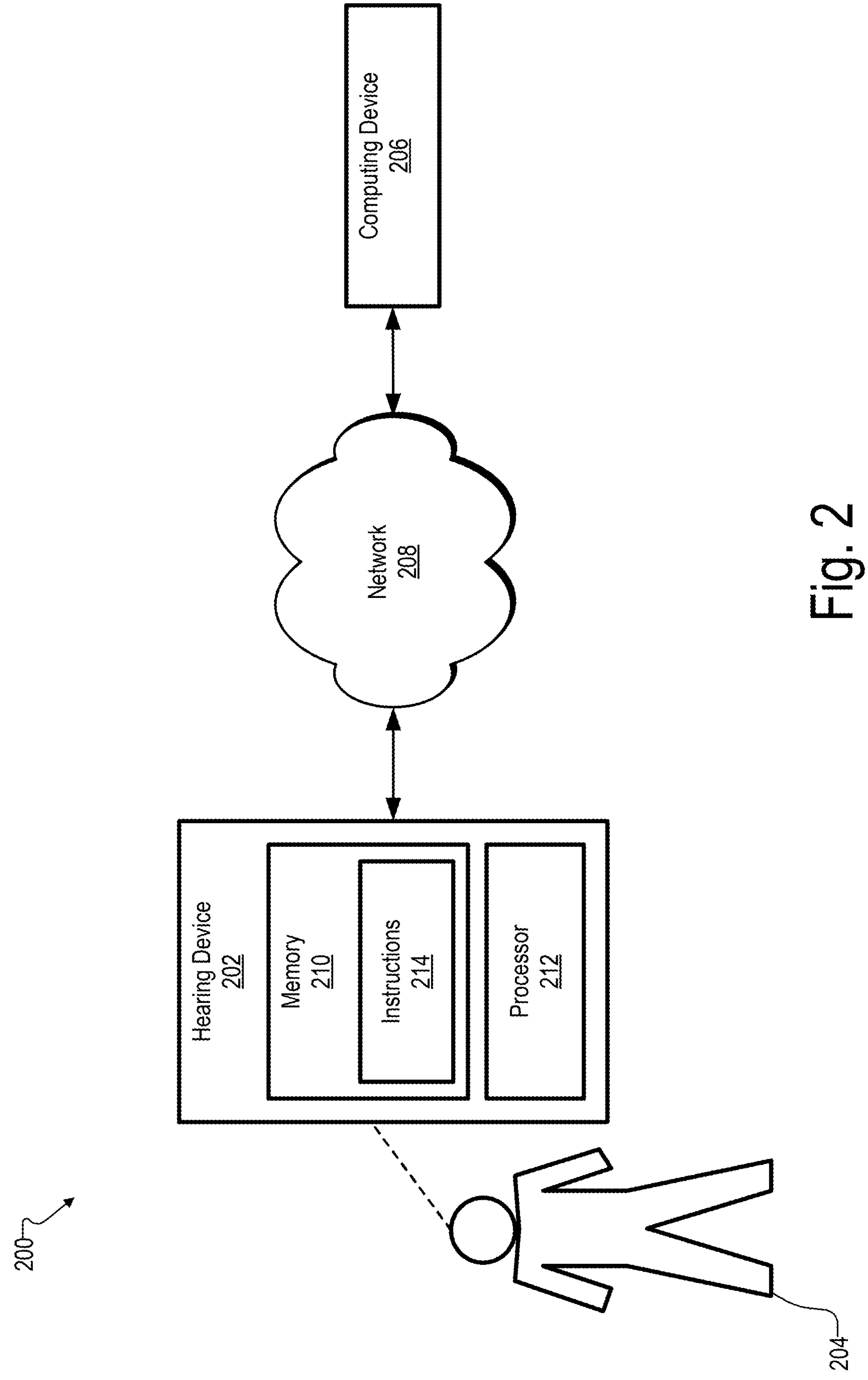
FIG. 2 illustrates an exemplary implementation of the hearing system of FIG. 1 according to principles described herein.

System 100 may be implemented in any suitable manner. For example, system 100 may be implemented by a hearing device and/or a computing device that is communicatively coupled in any suitable manner to the hearing device. To illustrate an example, FIG. 2 shows an exemplary implementation 200 in which system 100 may be provided in certain implementations. As shown in FIG. 2, implementation 200 includes a hearing device 202 that is associated with a user 204 and that is communicatively coupled to a computing device 206 by way of a network 208.

Hearing device 202 may correspond to any suitable type of hearing device such as described herein. Hearing device 202 may include, without limitation, a memory 210 and a processor 212 selectively and communicatively coupled to one another. Memory 210 and processor 212 may each include or be implemented by hardware and/or software components (e.g., processors, memories, communication interfaces, instructions stored in memory for execution by the processors, etc.). In some examples, memory 210 and processor 212 may be housed within or form part of a BTE housing. In some examples, memory 210 and processor 212 may be located separately from a BTE housing (e.g., in an ITE component). In some alternative examples, memory 210 and processor 212 may be distributed between multiple devices (e.g., multiple hearing devices in a binaural hearing system) and/or multiple locations as may serve a particular implementation.

Memory 210 may maintain (e.g., store) executable data used by processor 212 to perform any of the operations associated with hearing device 202. For example, memory 210 may store instructions 214 that may be executed by processor 212 to perform any of the operations associated with hearing device 202 assisting a user in hearing. Instructions 214 may be implemented by any suitable application, software, code, and/or other executable data instance.

Memory 210 may also maintain any data received, generated, managed, used, and/or transmitted by processor 212. For example, memory 210 may maintain any suitable data associated with a hearing loss profile of a user, input sound classifications, sound processing patterns, machine learning algorithms, and/or hearing device function data. Memory 210 may maintain additional or alternative data in other implementations.

Processor 212 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 212 may be implemented by any suitable combination of hardware and software. In certain examples, processor 212 may correspond to or otherwise include one or more deep neural network ("DNN") chips configured to perform any suitable machine learning operation such as described herein.

User 204 may be any individual that is a user of a hearing device. For example, user 204 may be located at a position in an environment and the hearing device may provide sound detected in the environment to user 204. The hearing device and/or computing device 206 may be configured to determine a hearing performance level of the hearing device and expected hearing performance levels at one or more other positions in the environment and perform a hearing performance enhancement operation based on such determinations.

Computing device 206 may include or be implemented by any suitable hardware and/or software components (e.g., processors, memories, communication interfaces, instructions stored in memory for execution by the processors, etc.) and may include any combination of computing devices as may serve a particular implementation. In some examples, computing device 206 may be implemented by a mobile phone, a mobile computing device, a tablet computer, a laptop computer, a desktop computer, a server or server system, and/or any other suitable computing device and/or system that may be configured to improve a hearing performance level of the hearing device. In such examples, computing device 206 may be configured to perform any suitable operations such as those described herein to improve hearing performance for user 204 by way of hearing device 202 based on positions in the environment.

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and computing device 206. In certain examples, network 208 may be implemented by a Bluetooth protocol (e.g., Bluetooth Classic, Bluetooth Low Energy ("LE"), etc.) and/or any other suitable communication protocol to facilitate communications between hearing device 202 and computing device 206. Communications between hearing device 202, computing device 206, and any other device/system may be transported using any one of the above-listed networks, or any combination or sub-combination of the above-listed networks.

System 100 may be implemented by computing device 206 or hearing device 202. Alternatively, system 100 may be distributed across computing device 206 and hearing device 202, or distributed across computing device 206, hearing device 202, and/or any other suitable computing system/device.

Hearing device 202 may include sound processing algorithms that may be configured to optimize hearing performance provided by the hearing device 202 to the user. For example, hearing device 202 may have speech processing algorithms and background noise processing algorithms that are configured to accentuate speech understanding in a noisy environment. However, characteristics of the environment may contribute to the efficacy of hearing device 202 to apply such algorithms or otherwise provide an optimal hearing performance level. For instance, in a busy restaurant, conversations from another table may affect the speech versus background noise processing. As another example, in a room with a long reverberation time, speech understanding may be impaired by superimpositions of direct sound.

Fortunately, there are hearing strategies that may be helpful in such environments. For instance, in the restaurant example, the signal-to-noise ratio (SNR) may be improved by shortening a distance to a conversation partner. Additionally or alternatively, the speech versus background noise processing may be improved by sitting with the user's back to more of the other (and/or closer) tables in the restaurant. In the example of the room with the long reverberation time, different positionings in the room may reduce reverberation and thereby improve hearing performance provided by hearing device 202.

While such hearing strategies may be taught to the user (e.g., by a hearing care professional (HCP)), application of the hearing strategies may be deficient due to myriad factors. For example, the user may not ever learn the hearing strategies, from an HCP or otherwise. Additionally or alternatively, the user may forget the hearing strategies applicable to a particular situation by the time the situation arises. Additionally or alternatively, the user may know to apply the hearing strategy, but applying the hearing strategy in a particular situation may not be straightforward (e.g., if there are multiple conflicting factors that may affect the hearing performance based on the environment).

Therefore, system 100 may be configured to improve hearing performance of hearing device 202 in an environment by implementing and teaching the hearing strategies based on real-life environments encountered by the user. For example, system 100 may provide real-time instruction based on one or more images of the environment provided by the user to system 100, such as via an ecological momentary intervention (EMI). Additionally or alternatively, system 100 may provide teaching opportunities based on one or more images of environments encountered by the user (e.g., for better positioning in similar environments encountered in the future). Based on these and other example hearing performance enhancement operations performed by system 100, the user may learn how to optimally apply hearing strategies to optimize hearing performance provided by hearing device 202.

Figure 3:
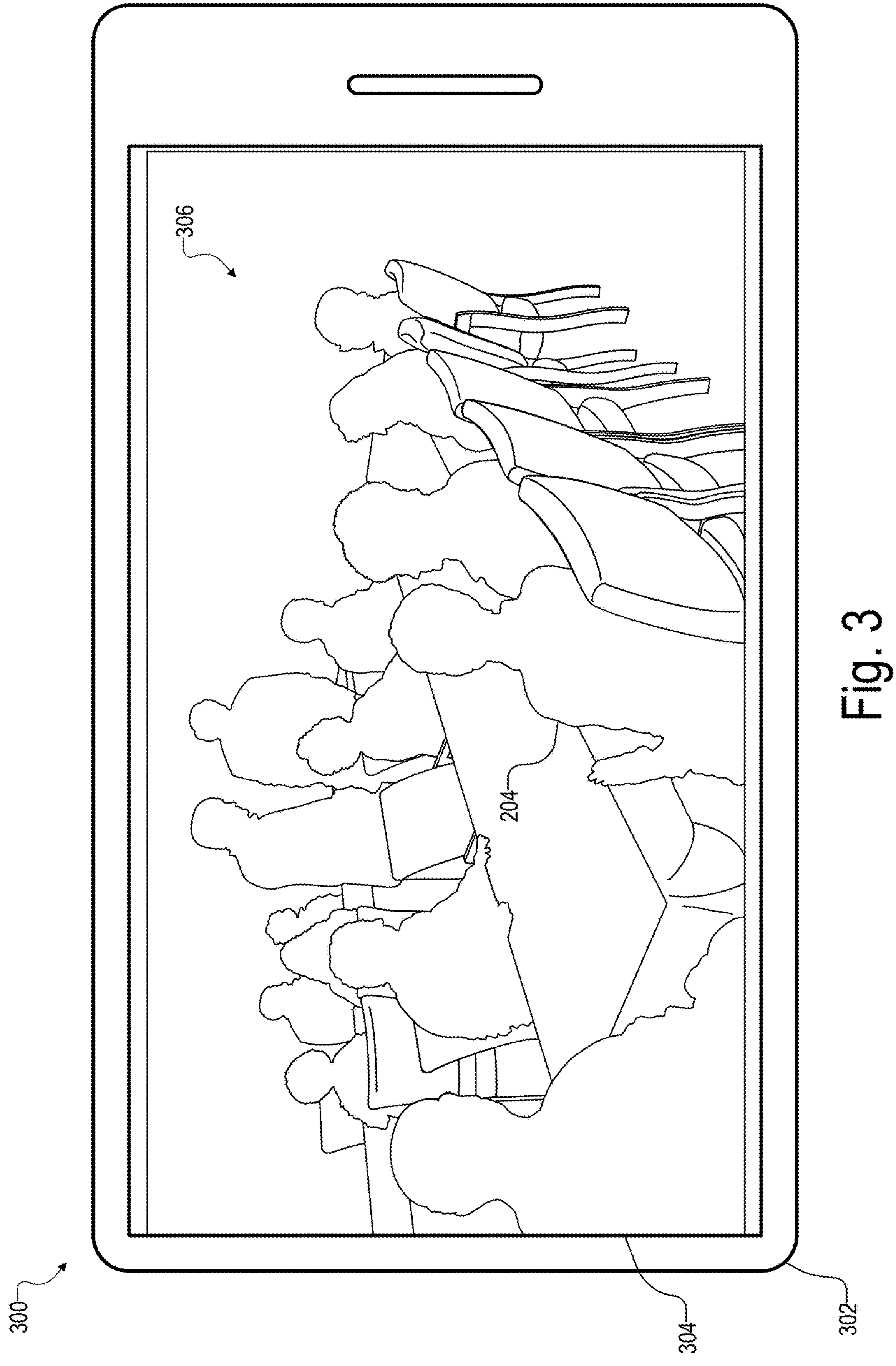
FIGS. 3-9B illustrate exemplary configurations that may be provided according to principles described herein.

FIG. 3 shows an example configuration 300 for improving hearing performance by a hearing device (e.g., hearing device 202). For example, configuration 300 shows a mobile device 302 that may be used by a user of hearing device 202. In some examples, the user may capture an image 304 of the environment using mobile device 302, which may then be accessed by system 100 (e.g., mobile device 302 and/or hearing device 202). Additionally or alternatively, system 100 may access image 304 in any suitable manner, such as receiving, retrieving, or otherwise obtaining image 304 from any other sensor (e.g., a camera), computing device, and/or system and/or generating image 304 based on data from any sensor and/or computing device/system.

Image 304 may depict and/or otherwise indicate a position of the user in the environment. For example, image 304 may be captured from a viewpoint of the user in the environment. For instance, the user may be taking pictures and/or capturing video of the user's environment using mobile device 302. In such instances, the position of the user may be indicated by the perspective and/or viewpoint of the image. Such a position of the user may be determined in any suitable manner, such as image analysis and/or other algorithms, including machine learning algorithms. For example, if the one or more images provided include a live video stream, this may indicate that the user is located at the point from which the images are captured. As another example, if image 304 includes people looking at and/or seemingly interacting with a person from whose viewpoint image 304 is captured, this may also indicate that the user's position in the environment is at a location of one capturing image 304. Additionally or alternatively, mobile device 302 and hearing device 202 may be communicatively coupled and include sensor data and/or other data transmitted between mobile device 302 and hearing device 202 that may indicate a close proximity between hearing device 202 and mobile device 302 as image 304 is captured, indicating that the user's position in the environment is at the location (or within close proximity) of one capturing image 304. Additionally or alternatively, the user may provide input indicating that image 304 is captured from the viewpoint of the user.

Additionally or alternatively, the user or a portion of the user (and correspondingly, the position of the user) may be depicted in image 304. For example, in image 304, user 204 may be shown in image 304, along with an environment 306 of user 204. System 100 may determine the position of user 204 depicted in image 304 in any suitable manner. For instance, system 100 may be configured to identify user 204 using image processing algorithms (e.g., facial recognition, gait analysis, structural analysis, etc.) in image 304 (and/or one or more images including image 304 such as a video). Additionally or alternatively, system 100 may receive user input identifying user 204 in image 304.

Figure 4:
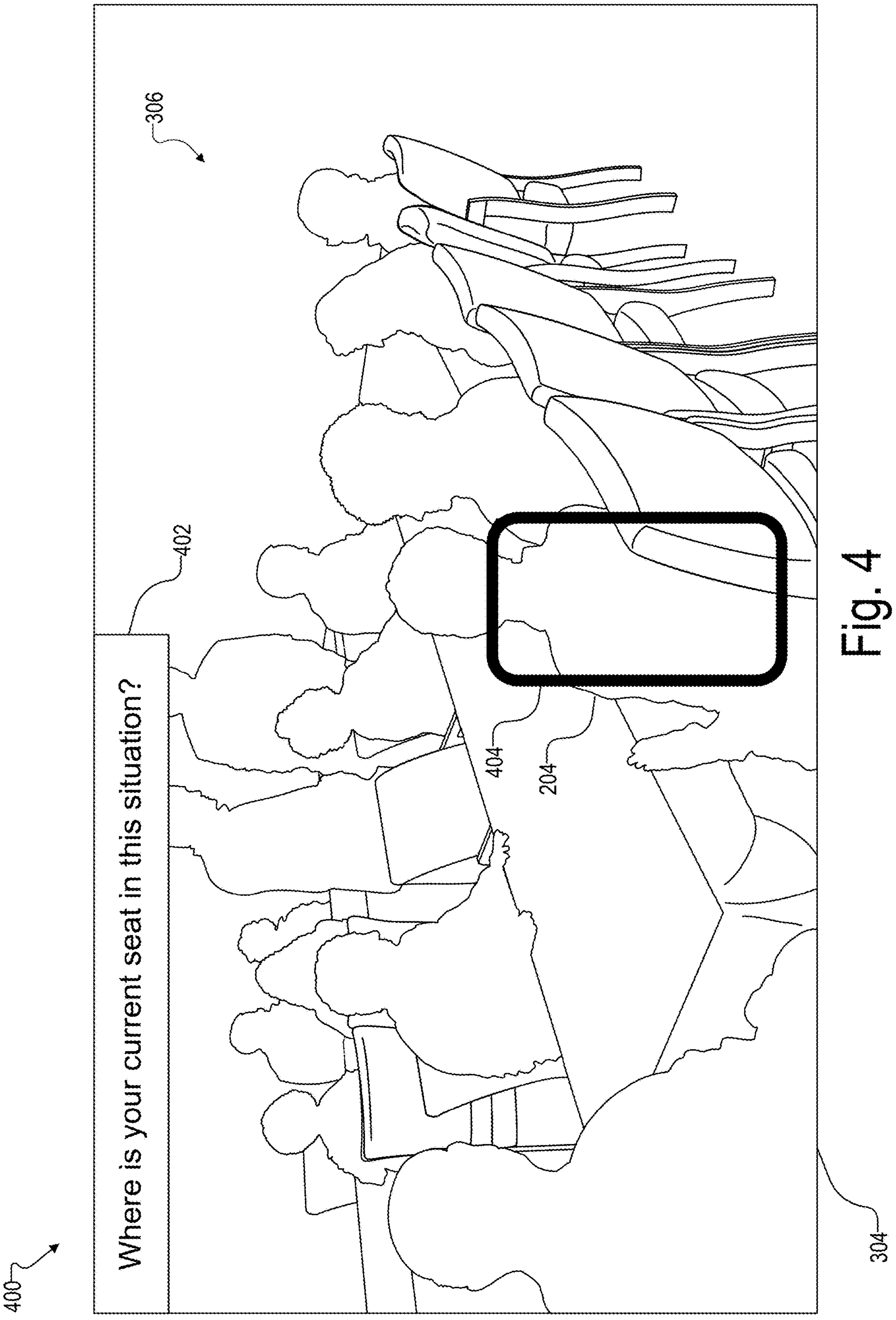

For example, FIG. 4 shows an example configuration 400 that is similar to configuration 300 and includes a prompt 402 (e.g., provided on mobile device 302, not shown) for user 204 to input a location of user 204 in image 304. Based on prompt 402, user 204 may provide an input specifying (e.g., via an indicator 404) that user 204 is located at the position of indicator 404 in environment 306.

As shown, image 304 may depict user 204 in environment 306 that is a busy restaurant. As mentioned, such an environment may provide challenges for hearing device 202 to provide an optimal hearing performance level to user 204. For instance, as shown, user 204 is seated at an end of a table, facing both the table at which user 204 is seated and a neighboring table. In such a seat, it may be suboptimal for hearing device 202 to apply background noise filtering algorithms since both the background noise and the foreground noise are coming from a similar direction relative to user 204 and hearing device 202. Thus, system 100 may be configured to perform a hearing performance enhancement operation, which may include any operation that may potentially improve the hearing performance provided by hearing device 202 to user 204 in environment 306, examples of which are described herein.

System 100 may be configured to determine a current hearing performance level being provided by hearing device 202 to user 204 at the current position of user 204. The current hearing performance level may be determined in any suitable manner. For example, hearing device 202 and/or system 100 may determine various audio quality metrics that evaluate the hearing performance level that hearing device 202 is currently providing (e.g., as detected by a microphone of hearing device 202 in real time). The metrics may include any suitable metrics, such as a signal levels, signal-to-noise ratio (SNR), average noise level, reverberation time, estimated noise floor, speech intelligibility (e.g., perceptual evaluation of speech quality (PESQ), speech transmission index (STI)), etc. For instance, system 100 may apply a deep learning algorithm (and/or any other machine learning algorithms) based on detected sound types in an environment (e.g., speech, transportation, nature, babble, general noise, reverberation, etc.) that provides a weighted combination of metrics of the detected sound types.

Additionally or alternatively, determining the current hearing performance level may be based on input provided by user 204. For example, user 204 may provide feedback such as a subjective rating of a satisfaction level with the hearing performance being provided by hearing device 202.

In some examples, system 100 may determine a hearing intention of user 204. For instance, on some occasions, user 204 may not be interested in trying to focus on a conversation at the table at which user 204 is seated. Rather, user 204 may be prefer to relax and treat most of the conversation and other noise around user 204 as background noise. On other occasions (or at various times within a same occasion), user 204 may be intending to listen to and/or participate in in the conversation at the table.

System 100 may determine the hearing intention of user 204 in any suitable manner. For instance, system 100 may analyze a directing of hearing device 202 and/or mobile device 302 toward (or away from) directions of sound sources, detect own voice audio that corresponds to conversation being held with other people, etc. Additionally or alternatively, system 100 may receive input from user 204 indicating the hearing intention of user 204.

Figure 5:
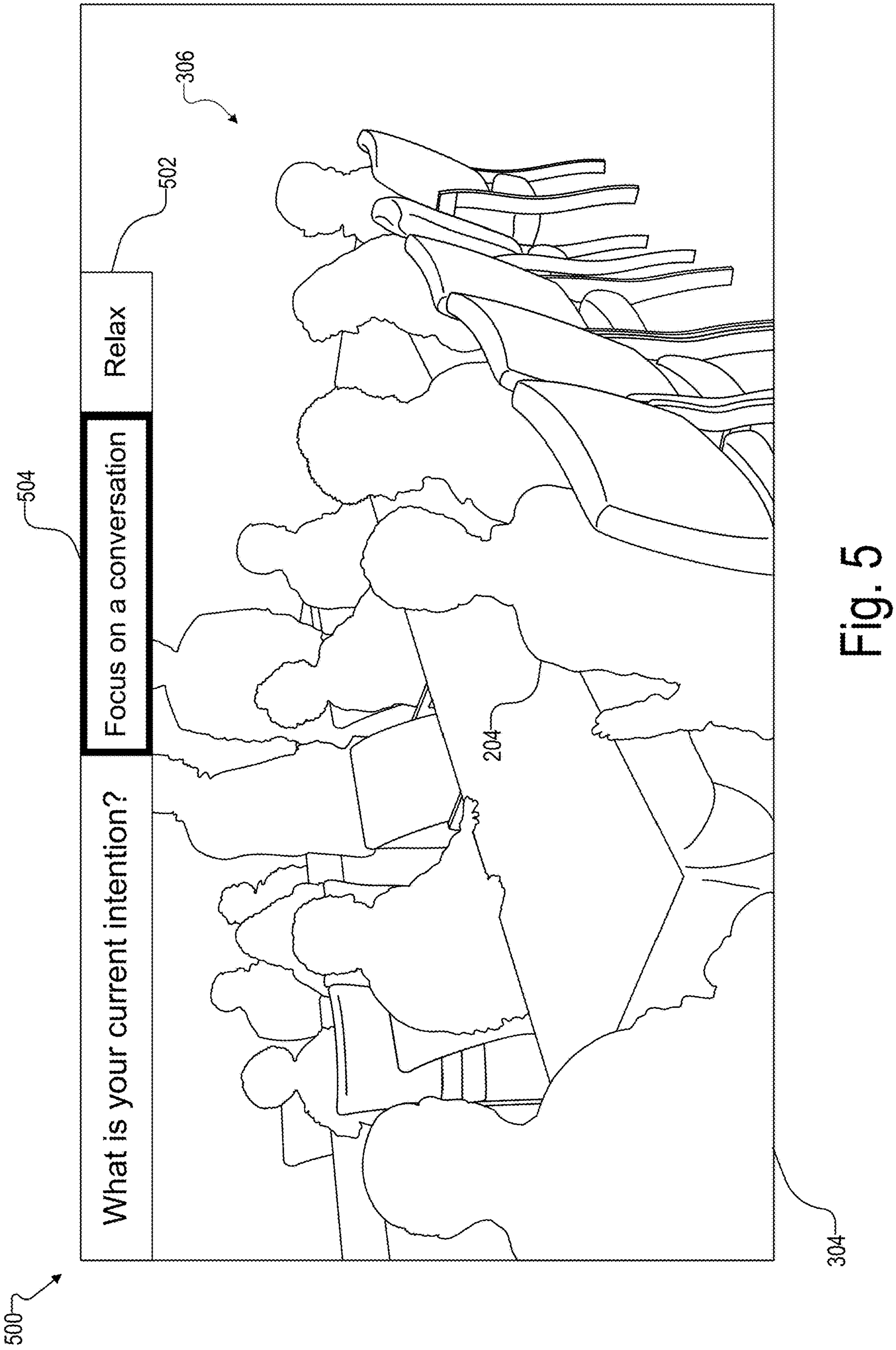

For example, FIG. 5 shows an example configuration 500 that is similar to configuration 300 and includes a prompt 502 (e.g., provided on mobile device 302, not shown) for user 204 to input a hearing intention of user 204. Based on prompt 502, user 204 may provide an input specifying (e.g., via an indicator 504) that user 204 intends, for example, to focus on conversation.

Based on different hearing intentions of user 204, system 100 may determine the hearing performance level differently (e.g., using different metrics, different weights for combining metrics, etc.). For instance, system 100 may determine a hearing performance level for a user intending to listen to music differently than for a user intending to participate in a conversation. Additionally or alternatively, system 100 may determine the hearing performance level using a same calculation but utilize the hearing performance level differently (e.g., comparing the hearing performance level to different thresholds, etc.).

For instance, in some examples, system 100 may compare the current hearing performance level to a threshold hearing performance level. Such a comparison may determine whether the current hearing performance level provided by hearing device 202 in environment 306 may potentially be improved by changing a position of user 204 in environment 306. For example, if the current hearing performance level meets the threshold hearing performance level, the current hearing performance level may be considered satisfactory and/or any potential for improved hearing performance at different positions in environment 306 may be minimal. Alternatively, if the current hearing performance level does not meet the threshold hearing performance level, there may be room for improvement by changing a position of user 204 in a way that applies hearing strategies for environment 306.

However, based on the hearing intention of user 204, user 204 may not be interested in changing positions to improve the hearing performance level. For instance, if user 204 intends to relax, a benefit of remaining in a position in environment 306 may outweigh a potential improvement in hearing performance. Thus, system 100 may use the hearing intention to apply different threshold hearing performance levels for whether to perform hearing performance enhancement operations. Additionally or alternatively, system 100 may use the hearing intention to adjust the hearing performance enhancement operations and/or characteristics of the hearing performance enhancement operations to be performed. For instance, a hearing performance enhancement operation may include providing a notification that system 100 has determined a position in environment 306 with an expected hearing performance level that is higher than the current hearing performance level. However, based on the hearing intention, system 100 may provide the notification based on different threshold differences between the expected hearing performance level and the current hearing performance level. For example, if user 204 intends to focus on the conversation, system 100 may provide the notification based on a smaller difference between the expected hearing performance level and the current hearing performance level than if user 204 intends to relax or not focus on the conversation.

Additionally or alternatively, threshold hearing performance levels may be based not only on hearing intentions but also (or alternatively) on the environment of user 204. For example, the restaurant shown in image 304 may be a particularly loud restaurant at a busy time, and/or the table at which user 204 is sitting may be located in the middle of the restaurant. In such cases, there may not be much improvement in hearing performance possible at any of the other seats at the table. As another example, user 204 may be in a train station, which may be a difficult scenario for hearing device 202 to provide above a threshold level of hearing performance regardless of a position within the train station. In such environments, system 100 may compare the current hearing performance level to a lower hearing performance threshold level (e.g., than a default hearing performance threshold level). In contrast, in an environment such as a lecture hall or a library where an expected hearing performance level may be relatively high, system 100 may apply a higher hearing performance threshold level.

System 100 may determine the threshold hearing performance level in any suitable manner. For example, system 100 may include and/or access a database of environments to determine environments similar to a current environment. Such a determination may be made in any suitable manner using any suitable characteristics. For example, characteristics may include acoustic characteristics, such as average noise level, reverberation time, estimated noise floor, etc., that may determine environments that may be acoustically similar to the current environment. Additionally or alternatively, characteristics may include physical characteristics, such as a size of an environment, a type of environment (e.g., a restaurant, a train station, a theater, etc.), a number of people and/or sound sources in an environment, types of sound sources in the environment, etc., that may determine environments that are physically and/or practically similar to the current environment.

Additionally or alternatively, system 100 may use global positioning system (GPS) data associated with an environment. The GPS data may be used to determine characteristics associated with the location to compare to other similar environments. For example, GPS data may be used to determine a type of environment a particular location is so that system 100 may compare the environment to other similar environments of a same or analogous type. Additionally or alternatively, the GPS data may be used to access a threshold hearing performance level associated with a specific location and/or data associated with the specific location that may be used to determine the threshold hearing performance level. For example, user 204 may have previously visited the specific location and provided input that may be used to determine an expected hearing performance level and/or the threshold hearing performance level. Additionally or alternatively, other users of system 100 may have provided inputs at the specific location (and/or similar, comparable locations) that may be used to determine the threshold hearing performance level. For instance, users of system 100 at a particular train station (which may be identified by GPS data) may be relatively satisfied with a hearing performance level provided by hearing device 202 even though the hearing performance level falls below a default threshold level as the expected hearing performance level in such an environment may be lower than typical. Based on such input, system 100 may lower the threshold hearing performance level for the particular train station for all users when at the particular train station, which may be determined based on GPS data.

Based on determining that the current hearing performance falls below a threshold hearing performance for environment 306, system 100 may perform one or more hearing performance enhancement operations. For example, based on the threshold determination, system 100 may provide a request to user 204 for image 304. Thus, system 100 (and/or hearing device 202) may monitor the current hearing performance and the threshold hearing performance for environment 306 and based on the current hearing performance falling below the threshold, request user 204 to provide one or more images of environment 306 so that system 100 may indicate other positions in environment 306 that may have higher expected hearing performances. Additionally or alternatively, user 204 may already have provided image 304 and/or system 100 may have accessed image 304 (e.g., based on user 204 being dissatisfied with the current hearing performance) prior to system 100 determining that the current hearing performance has fallen below the threshold hearing performance.

System 100 may determine, based on image 304, one or more expected hearing performance levels that may be potentially achievable at one or more other positions in environment 306. System 100 may determine expected hearing performance levels in any suitable manner. For example, system 100 may analyze acoustic information (e.g., via hearing device 202, mobile device 302, and/or video including image 304) and visual information, such as graphical content in image 304 (and/or video including image 304) to determine sound sources in environment 306. For instance, system 100 may use object recognition algorithms to determine common sources of sound, such as people, speakers, machines, cars, fans, air conditioners, walls (for reverberation), etc. System 100 may corroborate and/or augment such determinations using the available acoustic information.

System 100 may further analyze image 304 and the acoustic information to determine which sound sources may be background sound sources and which may be target sound sources (e.g., sound sources that user 204 may intend to focus on). System 100 may differentiate between target and background sound sources in any suitable manner. For example, system 100 may apply image processing algorithms, sound classification algorithms, and/or any other such algorithms, including machine learning algorithms. As one example, facial recognition algorithms may be used to determine people, which may be potential target sound sources. Further, eye recognition and/or head pose estimation algorithms may be applied to determine line of sight and/or whether specific people may be talking to user 204 and/or user 204 may be paying attention to specific people, which may be a further indication of target sound sources. Additionally or alternatively, objects such as fans, air conditioners, and other machines may be recognized using similar algorithms as potential background sound sources. Additionally or alternatively, acoustic analysis of environment 306 (e.g., detected by hearing device 202, provided with image 304, detected by mobile device 302, etc.) may provide indications of target or background sound sources. For instance, babble noise detected by hearing device 202 and its sources may considered background, while speech (e.g., detected at a threshold volume and/or from a particular direction, etc.) may indicate a target sound source. Additionally or alternatively, system 100 may receive input from user 204 indicating (e.g., on image 304) sound sources, target sound sources, and/or background sound sources.

Based on determining target sound sources and background sound sources, system 100 may determine an expected hearing performance level of a particular position based on an expected target hearing performance level at the particular position and an expected background hearing performance level at the particular position. For instance, the expected hearing performance level of a particular position may be a weighted combination of expected target hearing performance levels and background hearing performance levels of identified target and background sound sources in environment 306. System 100 may determine an expected target hearing performance level in any suitable manner. For example, system 100 may determine the expected target hearing performance level based on various metrics, such as a distance from the target sound source(s), a direction of the target sound sources relative to user 204 and/or hearing device 202, identifying any obstacles between hearing device 202 and the target sound sources, and/or any other suitable metrics. System 100 may determine the expected background hearing performance level based on similar and/or corresponding characteristics, such as a distance from the background sound source(s), a direction of the background sound sources, etc.

Additionally or alternatively, system 100 may determine an expected hearing performance level based on the current hearing performance level and/or previously determined hearing performance levels. For instance, system 100 may detect differences in hearing performance levels (e.g., target hearing performance levels, background hearing performance levels, and/or overall hearing performance levels) as user 204 moves through environment 306, which may provide additional data for determining expected hearing performance levels at other positions in environment 306.

Additionally or alternatively, system 100 may determine an expected hearing performance level using machine learning algorithms and/or any other suitable algorithms using acoustic information from environment 306 and/or visual information from image 304. Such algorithms may be based on inputs provided by user 204, such as input indicating whether the hearing performance level at one position is better or worse than another, whether the hearing performance level matches an expected hearing performance level, etc.

Based on determined expected hearing performance levels of one or more positions in environment 306, system 100 may perform a hearing performance enhancement operation such as presenting information including the expected hearing performance levels of the one or more positions to user 204. Such information may be presented in any suitable manner.

Figure 6:
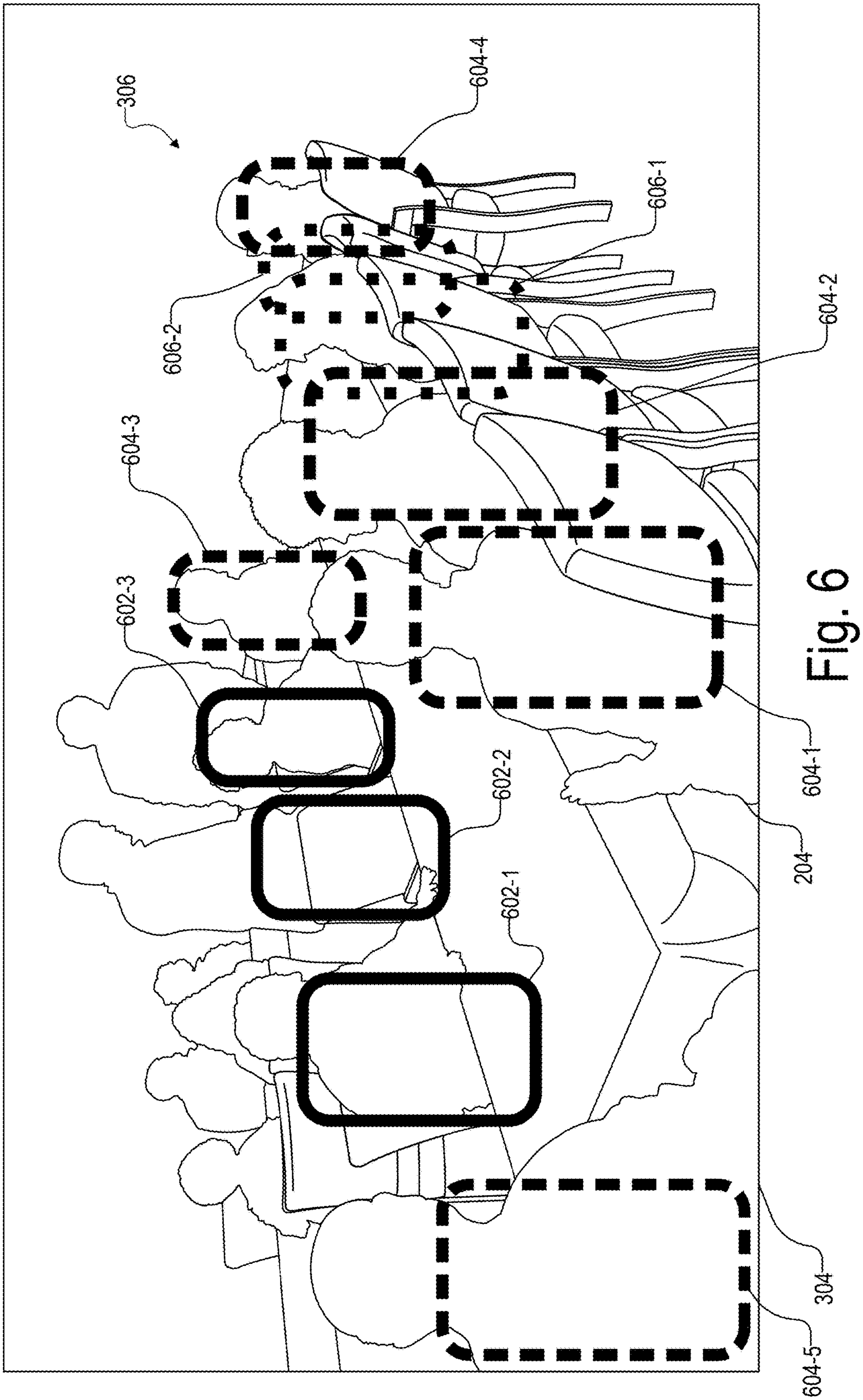

For example, FIG. 6 shows an example configuration 600 of a visual representation of expected hearing performances at one or more positions in environment 306. Configuration 600 shows image 304 with various indicators (e.g., indicators 602 through 606) that may indicate varying levels of expected hearing performance at each of the positions. For example, indicators 602 (e.g., indicator 602-1 through 602-3) are shown as solid rectangles (and/or may be provided as any suitable representation, such as different colors, shapes, etc.) and may indicate a relatively high expected level of hearing performance at the positions indicated. Indicators 604 (e.g., indicator 604-1 through 604-4) are shown as dashed rectangles and may indicate a relatively medium expected level of hearing performance at the positions indicated. Indicators 606 (e.g., indicator 606-1 and 606-2) are shown as dotted rectangles and may indicate a relatively low expected level of hearing performance at the positions indicated.

In configuration 600, positions indicated by indicators 602 may have higher expected hearing performance levels because the positions allow user 204 to face the table at which user 204 is seated while the neighboring table is positioned at a back of user 204. Such a positioning may allow hearing device 202 to more effectively apply background filtering algorithms to sounds being received from the rear of hearing device 202 while allowing hearing device 202 to also more effectively apply speech enhancement algorithms and/or beamforming algorithms to speech being detected from the front and/or side of hearing device 202. Correspondingly, positions indicated by indicators 604 may have a medium expected hearing performance level because the positions may allow for some level of background filtering algorithms and/or speech enhancement algorithms to be applied. Conversely, positions indicated by indicators 606 may have low expected levels of hearing performance as sound from both the table at which user 204 is seated and the neighboring table may be received by hearing device 202 from a same direction, making applying background filtering and/or speech enhancement algorithms difficult.

As shown, user 204 may be currently seated at the position indicated by indicator 604-1, which may indicate to user 204 that the current hearing performance level is at a medium level. Configuration 600 also may indicate to user 204 that positions across the table from user 204, indicated by indicators 602 may provide a higher level of hearing performance than the current hearing performance user 204 may be experiencing. Thus, user 204 may decide to move to the empty seat available at the position indicated by indicator 602-2. In this manner, system 100 may enhance the hearing performance level experienced by user 204 based on image 304 and further educate user 204 on the hearing strategy to apply in such circumstances.

Figure 7:
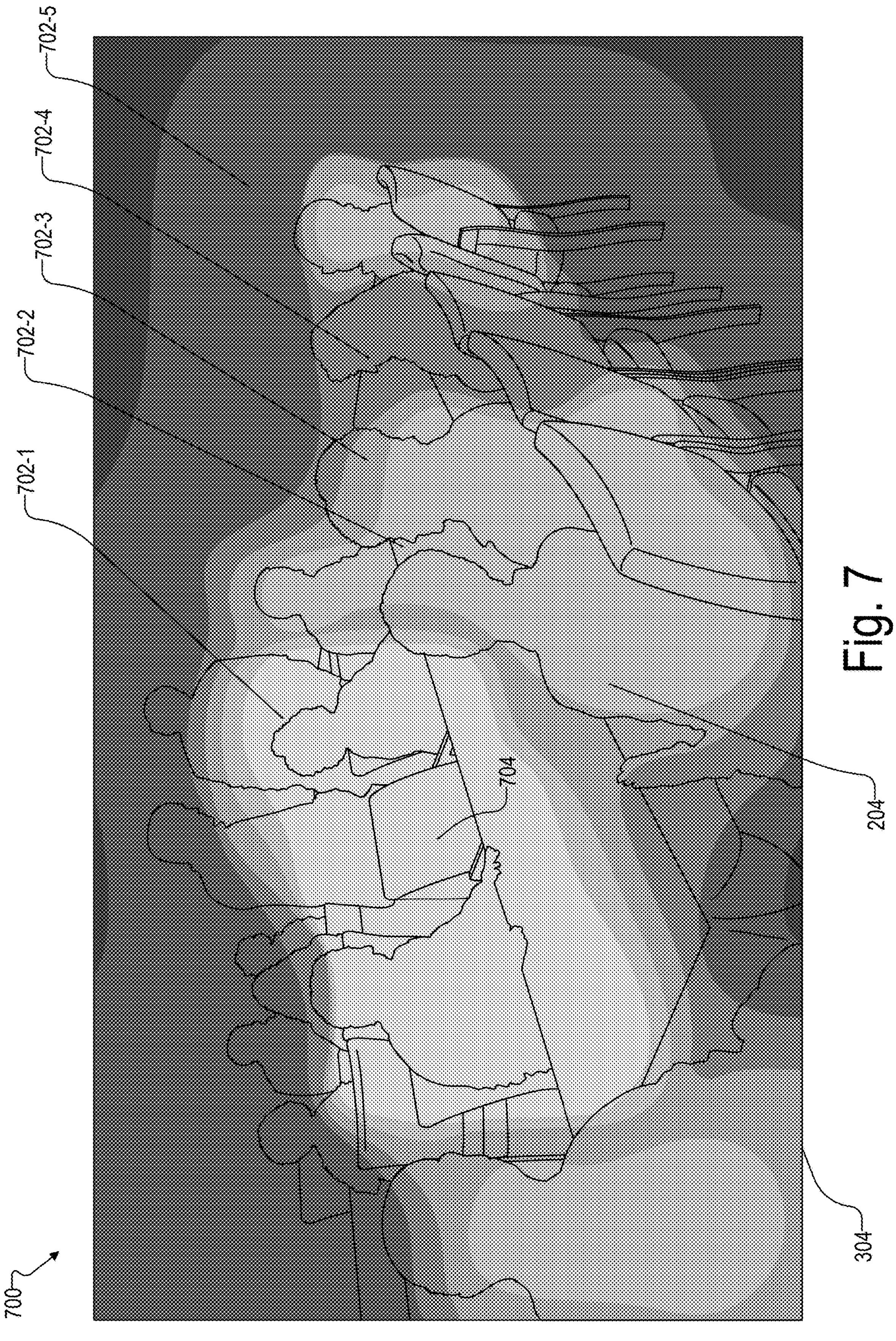

FIG. 7 shows an example configuration 700 that shows another visual representation through which system 100 may perform hearing performance enhancement operations, such as providing an indication of expected hearing performance levels at one or more positions in environment 306. The visual representation of configuration 700 may convey similar information to the visual representation of configuration 600, but with a heat map overlaid on image 304. The heat map may include various colors, shadings, or indicators 702 (e.g., indicators 702-1 through 702-5) and/or any other suitable representation that depicts delineations between expected hearing performance levels associated with various positions in environment 306. As shown, the heat map may include a light indicator 702-1 that indicates a high expected hearing performance level. As described, the positions shaded with indicator 702-1 may have the higher expected hearing performance level due to better positioning of user 204 and hearing device 202 to apply algorithms such as beamforming and background filtering at such positions. Correspondingly, gradations in indicator 702 may depict different expected hearing performance levels. In the heat map shown, the darker shades may correspond to lower expected hearing performance levels. Thus, indicator 702-2 may indicate a next lower level of expected hearing performance level (e.g., correlating to indicators 604 in configuration 600), followed by indicator 702-3, indicator 702-4, and indicator 702-5 representing a lowest expected hearing performance level determined in environment 306. Based on the presented information, user 204 may determine that seat 704 may provide an optimal hearing performance level for environment 306.

While the heat map in configuration 700 shows five (or six) shades, the heat map may include any suitable number of colors or other representations of different ranges of expected hearing performance levels. For instance, system 100 may determine three or five or any suitable number of ranges of hearing performance levels and indicate each range with a different type of indicator. The number of ranges and corresponding indicators may be predetermined (e.g., indicator 702-1 applies to a range of 0.8 to 1, indicator 702-2 applies to a range of 0.6 to 0.8, etc.) and/or dynamic based on expected hearing performance levels as calculated in environment 306. For example, the relative levels may be determined relative to a current hearing performance level. For instance, a high expected level (and/or representation) may be reserved for positions with an expected hearing performance level higher than the current hearing performance level, and thus may change based on the current hearing performance level. In this manner, while in configuration 700 the current hearing performance level may be indicated to user 204 via indicator 702-2 being applied to the current position of user 204. In other examples where the current position of user 204 is not depicted in image 304, the current hearing performance level may be indicated via indicators 702 applied to different positions.

Figure 8A:
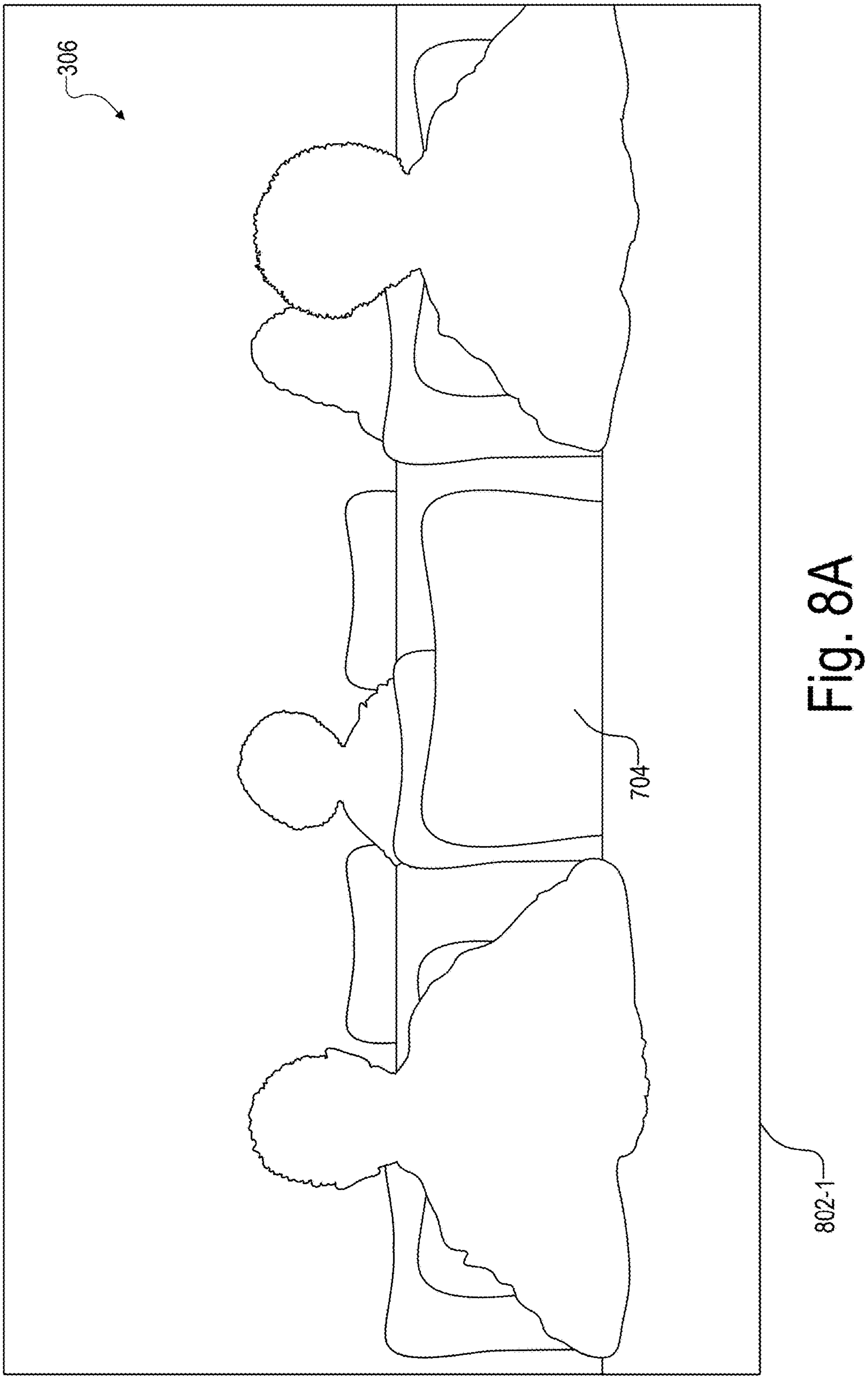
Figure 8B:
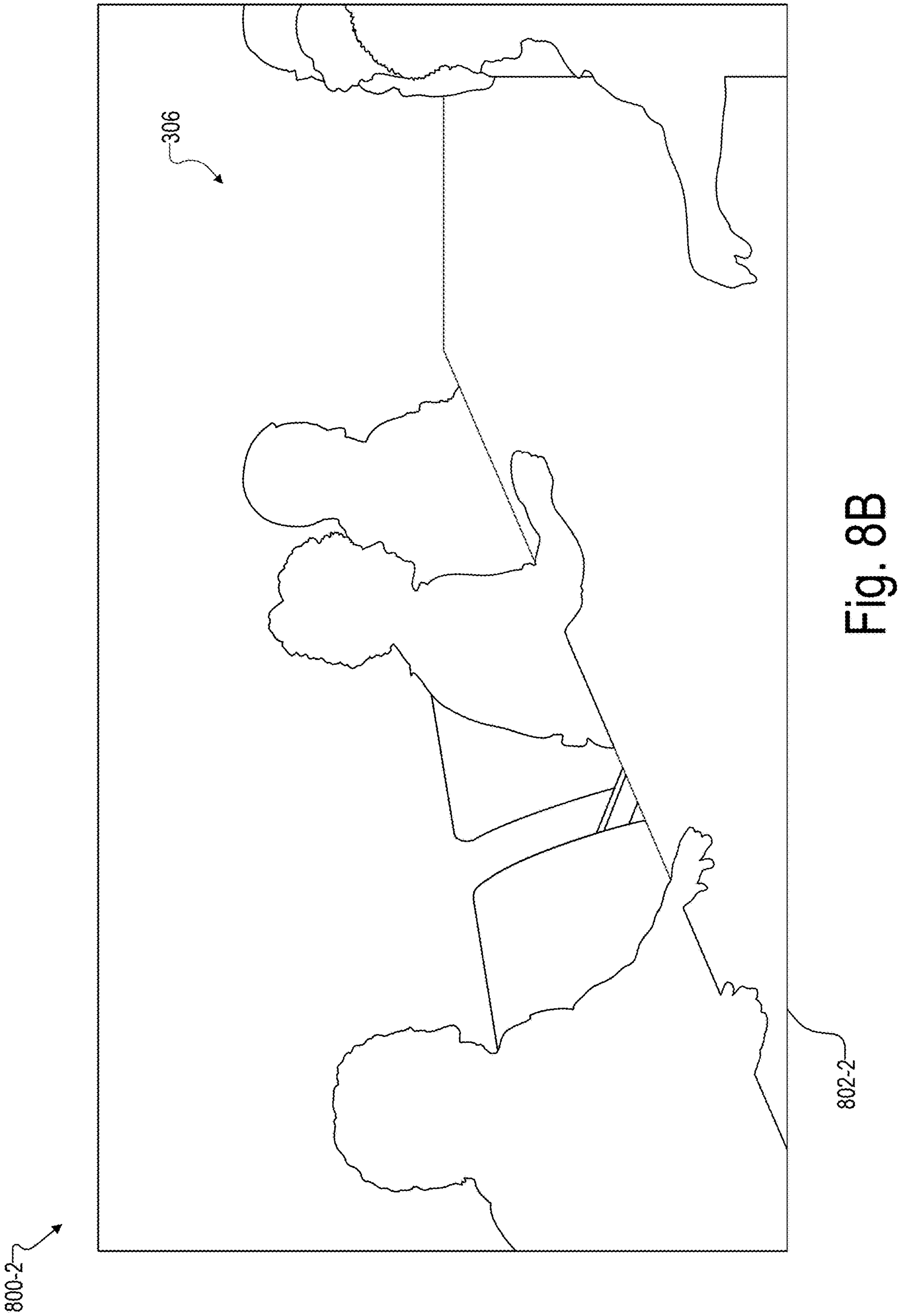

For example, FIG. 8A and FIG. 8B show configurations 800 (e.g., configuration 800-1 and 800-2) that may depict images 802 (e.g., image 802-1 and 802-2) captured of environment 306 from a point of view of user 204 (e.g., as seated in the position as shown in image 304). System 100 may determine that images 802 are captured from the perspective of user 204 in any suitable manner, as mentioned. For instance, system 100 may detect a line of sight of other people in images 802 that may be consistent with images 802 being captured from the point of view of user 204. Further, multiple images 802 (which may be included in a video) from a same perspective may be indicative of images 802 being captured from the point of view of user 204.

Configuration 800 may depict a similar scenario as configuration 300, with system 100 performing a hearing performance enhancement operation based on images 802. For example, system 100 may determine that a current hearing performance level may be improved in environment 306 and determine expected hearing performance levels for one or more other positions in environment 306 as depicted in images 802. Based on the current and expected hearing performance levels, system 100 may perform a hearing performance enhancement operation (e.g., provide a notification of a potential hearing performance level improvement and/or a direction to a position with a potential hearing performance level improvement, provide a display of different expected hearing performance levels, etc.).

Figure 9A:
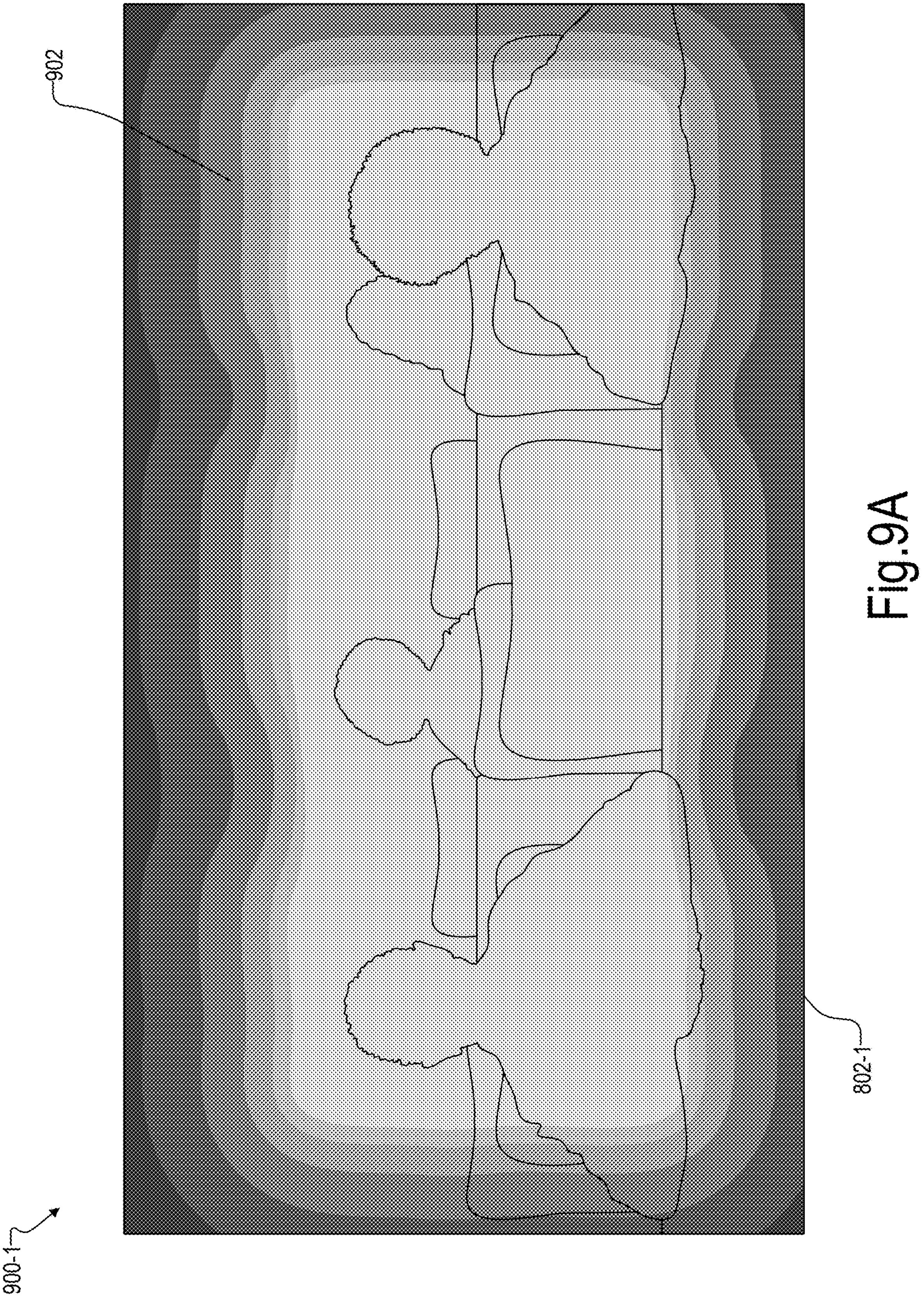
Figure 9B:
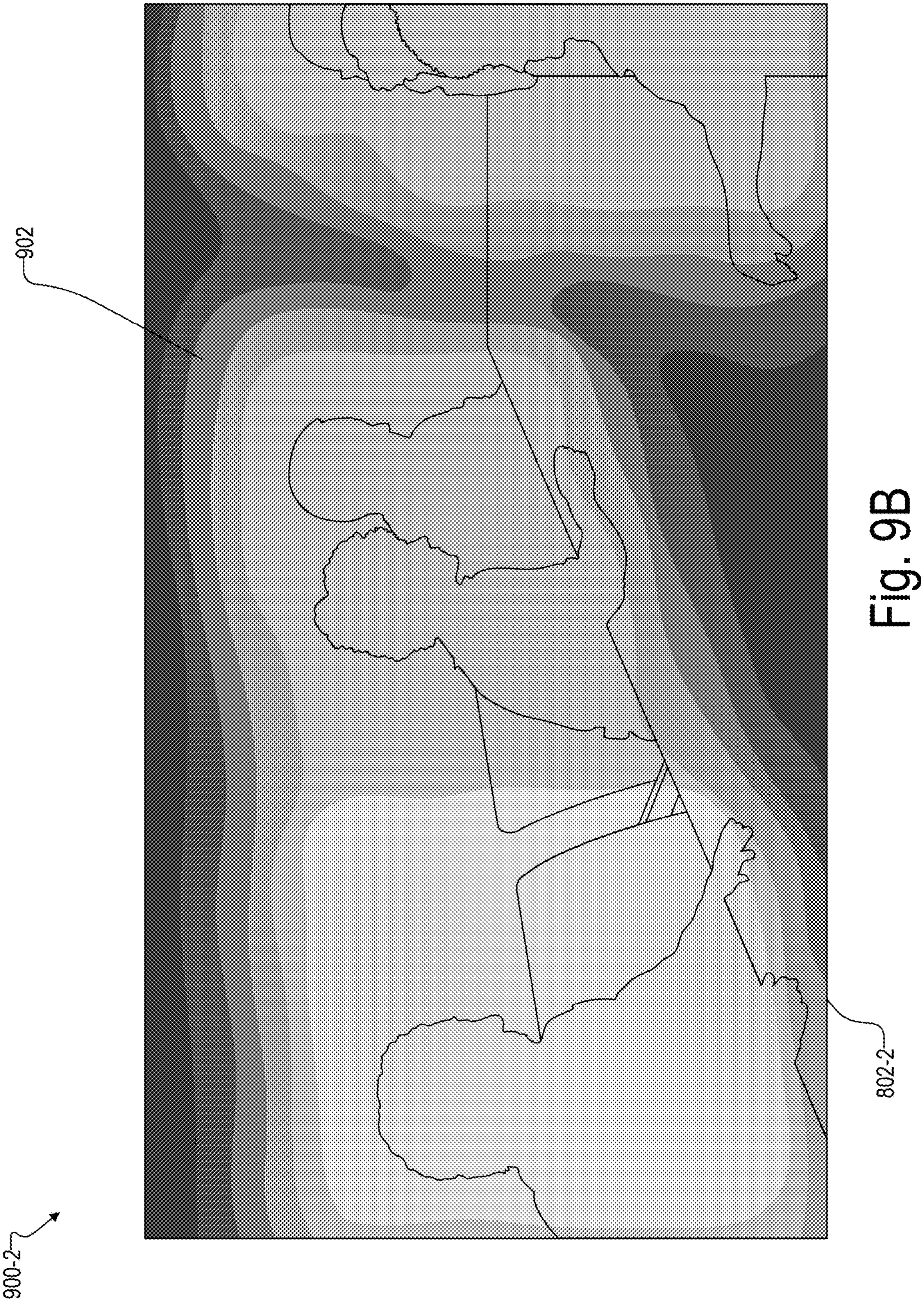

For example, FIG. 9A and FIG. 9B show configurations 900 (e.g., configuration 900-1 and 900-2) that may correspond to configurations 800 respectively, depicting a visual representation of expected hearing performance levels as determined by system 100. As shown, configuration 900-1 may include a heat map 902 overlaid on top of image 802-1 that indicates expected hearing performance levels at various positions shown in image 802-1. Likewise, configuration 900-2 may include heat map 902 overlaid on top of image 802-2 that indicates expected hearing performance levels at positions shown in image 802-2. In this manner, the representation of expected hearing performance levels may be provided as an augmented reality (AR) visualization. For instance, user 204 may hold up mobile device 302 to capture images of environment 306 in real time as system 100 superimposes heat map 902 (and/or any other suitable visualization) in real time (or near real time) of expected hearing performance levels of positions being captured in the images.

Additionally or alternatively, images 802 (and/or image 304 or any other images of environments of user 204) may be utilized by system 100 to generate tutorial material for the user, such as to learn hearing strategies based on real-life scenarios encountered by the user. Such tutorials may be provided in real time and/or at a later time for the user to apply lessons to similar environments encountered in the future. The tutorials may instruct a user with optimal positions in the environment and/or display the heat map or other representation of the positions in the environment and their relative expected hearing performance levels. Additionally or alternatively, the tutorials may be interactive, for instance, providing options for the user to select positions in the environment that have higher expected hearing performance levels. Additionally or alternatively, the tutorials may include explanation for expected hearing performance levels at different positions in the environment, for example, displaying different target and/or background sound sources and how such sound sources may affect the expected hearing performance level at a particular position. Additionally or alternatively, the tutorials may be provided utilizing AR or virtual reality (VR) technologies so the user may experience different simulated and/or recorded hearing performance levels at various positions in the environment.

Figure 10:
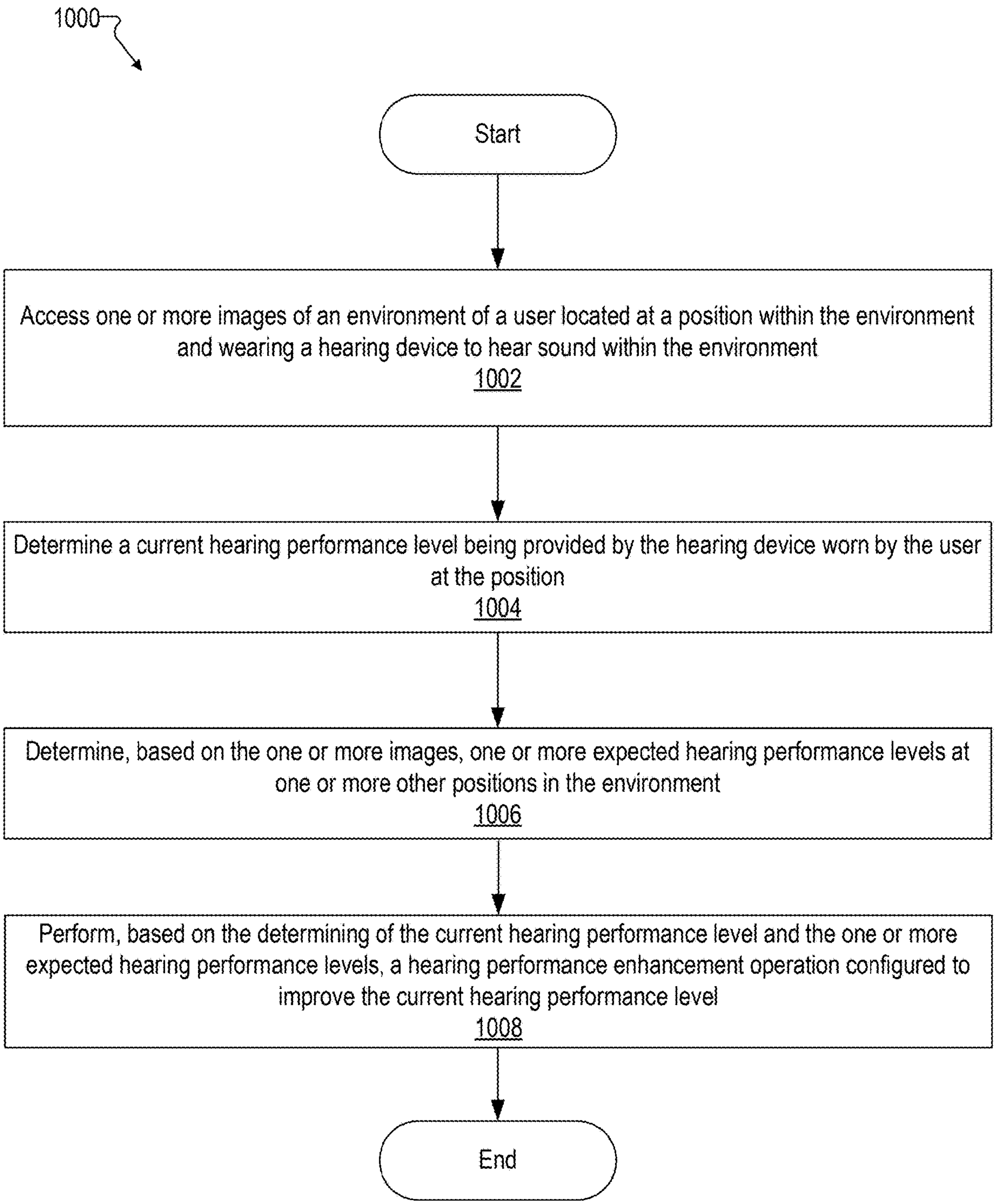
FIG. 10 illustrates an exemplary method according to principles described herein.

FIG. 10 illustrates an exemplary method 1000 for improving hearing performance by a hearing device according to principles described herein. While FIG. 10 illustrates exemplary operations according to one embodiment, other embodiments may omit, add to, reorder, and/or modify any of the operations shown in FIG. 10. One or more of the operations shown in FIG. 10 may be performed by a hearing device such as hearing device 202, a computing device such as computing device 206, an additional computing device communicatively coupled to computing device 206 and/or hearing device 202, any components included therein, and/or any combination or implementation thereof.

At operation 1002, a hearing system such as hearing system 100 may access one or more images of an environment of a user located at a position within the environment and wearing a hearing device to hear sound within the environment. Operation 1002 may be performed in any of the ways described herein.

At operation 1004, the hearing system may determine a current hearing performance level being provided by the hearing device worn by the user at the position. Operation 1004 may be performed in any of the ways described herein.

At operation 1006, the hearing system may determine, based on the one or more images, one or more expected hearing performance levels at one or more other positions in the environment. Operation 1006 may be performed in any of the ways described herein.

At operation 1008, the hearing system may perform, based on the determining of the current hearing performance level and the one or more expected hearing performance levels, a hearing performance enhancement operation configured to improve the current hearing performance level. Operation 1008 may be performed in any of the ways described herein.

In some examples, a computer program product embodied in a non-transitory computer-readable storage medium may be provided. In such examples, the non-transitory computer-readable storage medium may store computer-readable instructions in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 11:
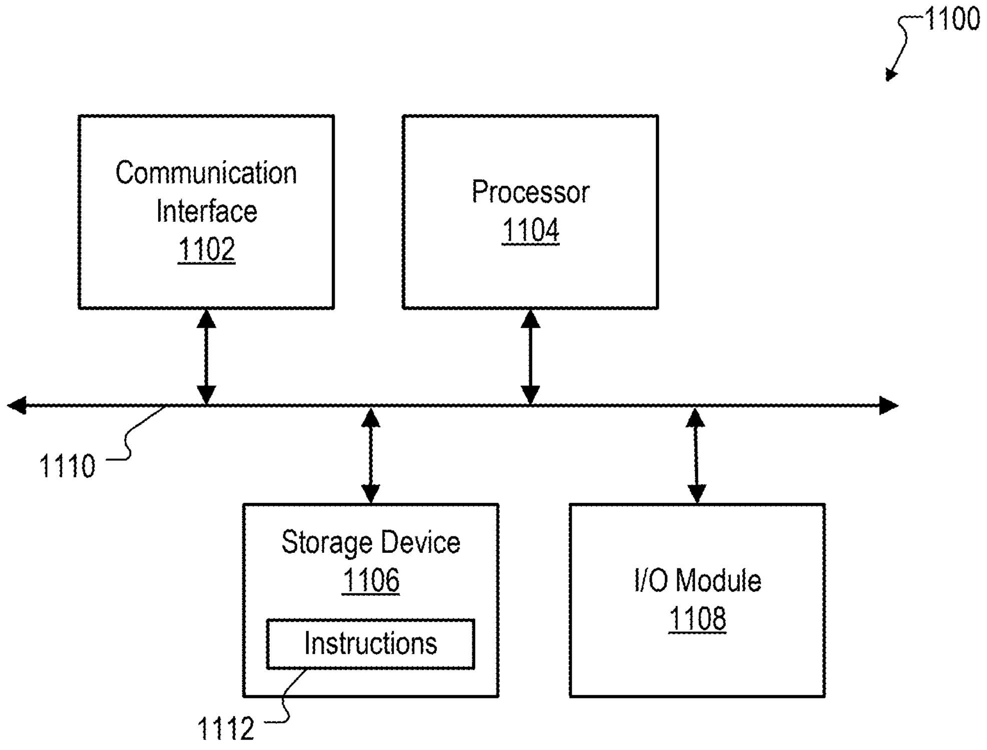
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 1100. For example, memory 102 and/or memory 210 may be implemented by storage device 1106, and processor 104 and/or processor 212 may be implemented by processor 1104.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

accessing, by a processor, one or more images of an environment of a user located at a position within the environment and wearing a hearing device to hear sound within the environment;

determining, by the processor, a current hearing performance level being provided by the hearing device worn by the user at the position;

determining, by the processor based on the one or more images, one or more expected hearing performance levels at one or more other positions in the environment; and performing, by the processor based on the determining of the current hearing performance level and the one or more expected hearing performance levels, a hearing performance enhancement operation configured to improve the current hearing performance level, wherein the performing the hearing performance enhancement operation comprises providing an indication of at least one of the one or more other positions in the environment where the expected hearing performance level is higher than the current hearing performance level.

2. The method of claim 1, wherein the providing the indication of at least one of the one or more other positions comprises providing a visual representation including the one or more images of the environment.

3. The method of claim 2, wherein the visual representation comprises a heat map representing the expected hearing performances at the one or more other positions overlaid on the one or more images of the environment.

4. The method of claim 2, wherein:

the one or more images comprises real-time images captured by a camera of a device; and the providing the visual representation comprises providing augmented reality (AR) images comprising a visualization superimposed on the real-time images for display on the device.

5. The method of claim 1, further comprising receiving input from the user indicating the position within the environment that the user is located in the one or more images.

6. The method of claim 1, further comprising determining, based on the one or more images, that the one or more images depict a viewpoint from the position within the environment that the user is located.

7. The method of claim 1, further comprising receiving input from the user indicating a listening intention of the user, and wherein the determining the one or more expected hearing performance levels at the one or more other positions in the environment is further based on the listening intention.

8. The method of claim 1, further comprising:

determining, by the processor, that the current hearing performance level is below a threshold hearing performance level; and requesting, by the processor and based on the determining that the current hearing performance level is below the threshold, the one or more images of the environment of the user.

9. The method of claim 8, wherein the determining the current hearing performance is below the threshold hearing performance level comprises comparing detected audio quality metrics of the sound detected by the hearing device at the position to reference audio quality metrics of sound detected in comparable environments.

10. The method of claim 1, wherein the determining the one or more expected hearing performance levels comprises determining a target sound source and a background sound source.

11. The method of claim 10, wherein the determining the target sound source and the background sound source comprises receiving an input from the user indicating at least one of the target sound source or the background sound source.

12. The method of claim 10, wherein the determining the target sound source and the background sound source comprises determining at least one of the target sound source or the background sound source using an image processing algorithm on the one or more images.

13. The method of claim 10, wherein the determining the target sound source and the background sound source comprises determining at least one of the target sound source and the background sound source based on acoustic analysis of sound detected by the hearing device.

14. The method of claim 10, wherein the determining the one or more expected hearing performance levels at the one or more other positions in the environment comprises determining a combination of an expected target hearing performance level of the hearing device detecting sound from the target sound source an expected background hearing performance level of the hearing device detecting and filtering sound from the background sound source.

15. A computer program product embodied in a non-transitory computer-readable storage medium and comprising computer instructions for performing a process comprising:

accessing, by a processor, one or more images of an environment of a user located at a position within the environment and wearing a hearing device to hear sound within the environment;

determining, by the processor, a current hearing performance level being provided by the hearing device worn by the user at the position;

determining, by the processor based on the one or more images, one or more expected hearing performance levels at one or more other positions in the environment; and performing, by the processor based on the determining of the current hearing performance level and the one or more expected hearing performance levels, a hearing performance enhancement operation configured to improve the current hearing performance level, wherein the performing the hearing performance enhancement operation comprises providing an indication of at least one of the one or more other positions in the environment where the expected hearing performance level is higher than the current hearing performance level.

16. The computer program product of claim 15, wherein:

the process further comprises receiving input from the user indicating a listening intention of the user; and the determining the one or more expected hearing performance levels at the one or more other positions in the environment is further based on the listening intention.

17. The computer program product of claim 15, wherein the process further comprises:

determining, by the processor, that the current hearing performance level is below a threshold hearing performance level; and requesting, by the processor and based on the determining that the current hearing performance level is below the threshold, the one or more images of the environment of the user.

18. A system comprising:

a memory that stores instructions; and a processor communicatively coupled to the memory and configured to execute the instructions to perform a process comprising:

accessing, by a processor, one or more images of an environment of a user located at a position within the environment and wearing a hearing device to hear sound within the environment;

determining, by the processor, a current hearing performance level being provided by the hearing device worn by the user at the position;

determining, by the processor based on the one or more images, one or more expected hearing performance levels at one or more other positions in the environment; and performing, by the processor based on the determining of the current hearing performance level and the one or more expected hearing performance levels, a hearing performance enhancement operation configured to improve the current hearing performance level, wherein the performing the hearing performance enhancement operation comprises providing an indication of at least one of the one or more other positions in the environment where the expected hearing performance level is higher than the current hearing performance level.

* * * * *